April 22, 1924.
H. LUTZ
MACHINE FOR TESTING BEARINGS
Filed June 28, 1919  6 Sheets-Sheet 4
1,491,050
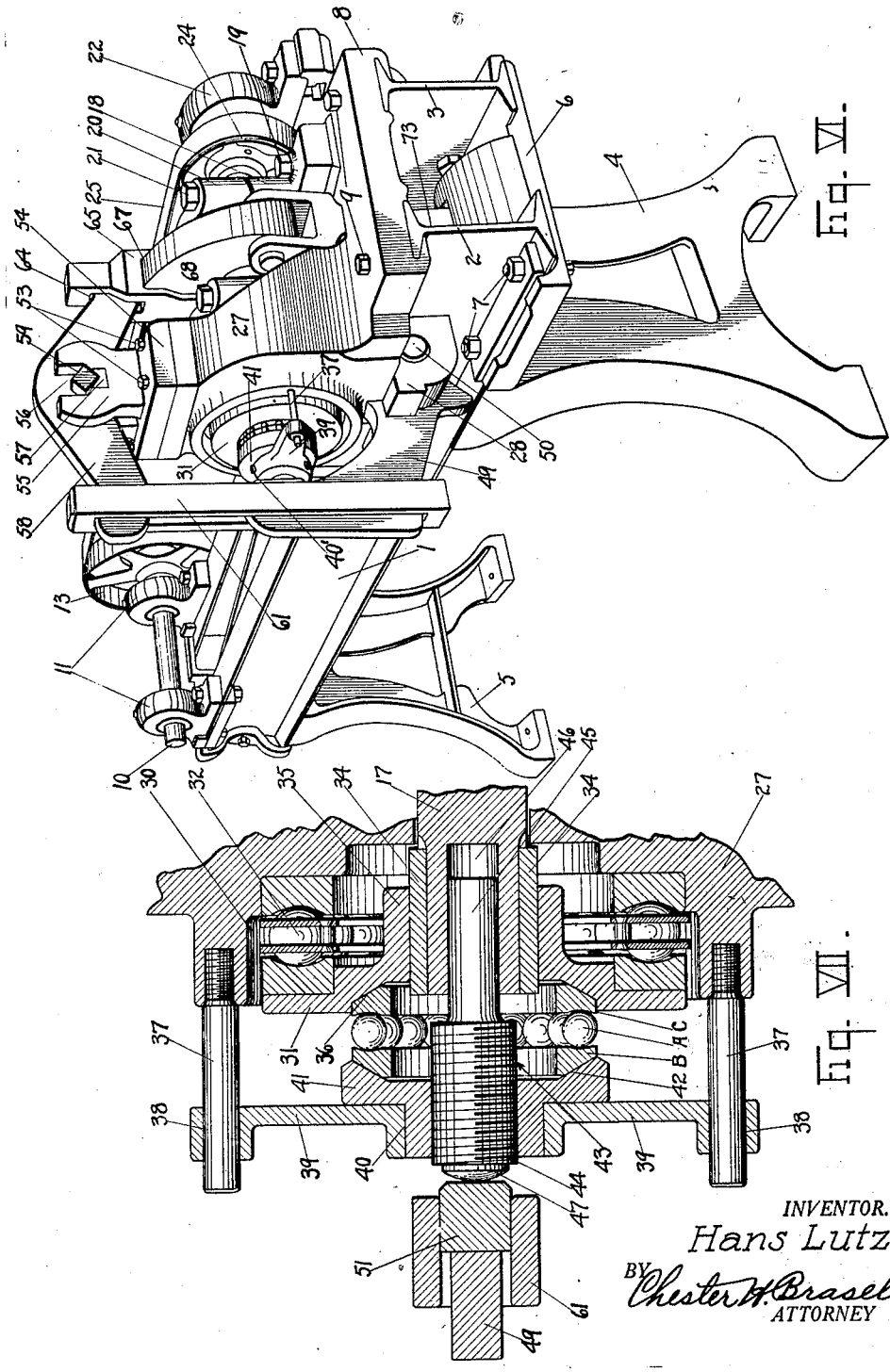
INVENTOR.
Hans Lutz
BY Chester H. Braselton
ATTORNEY

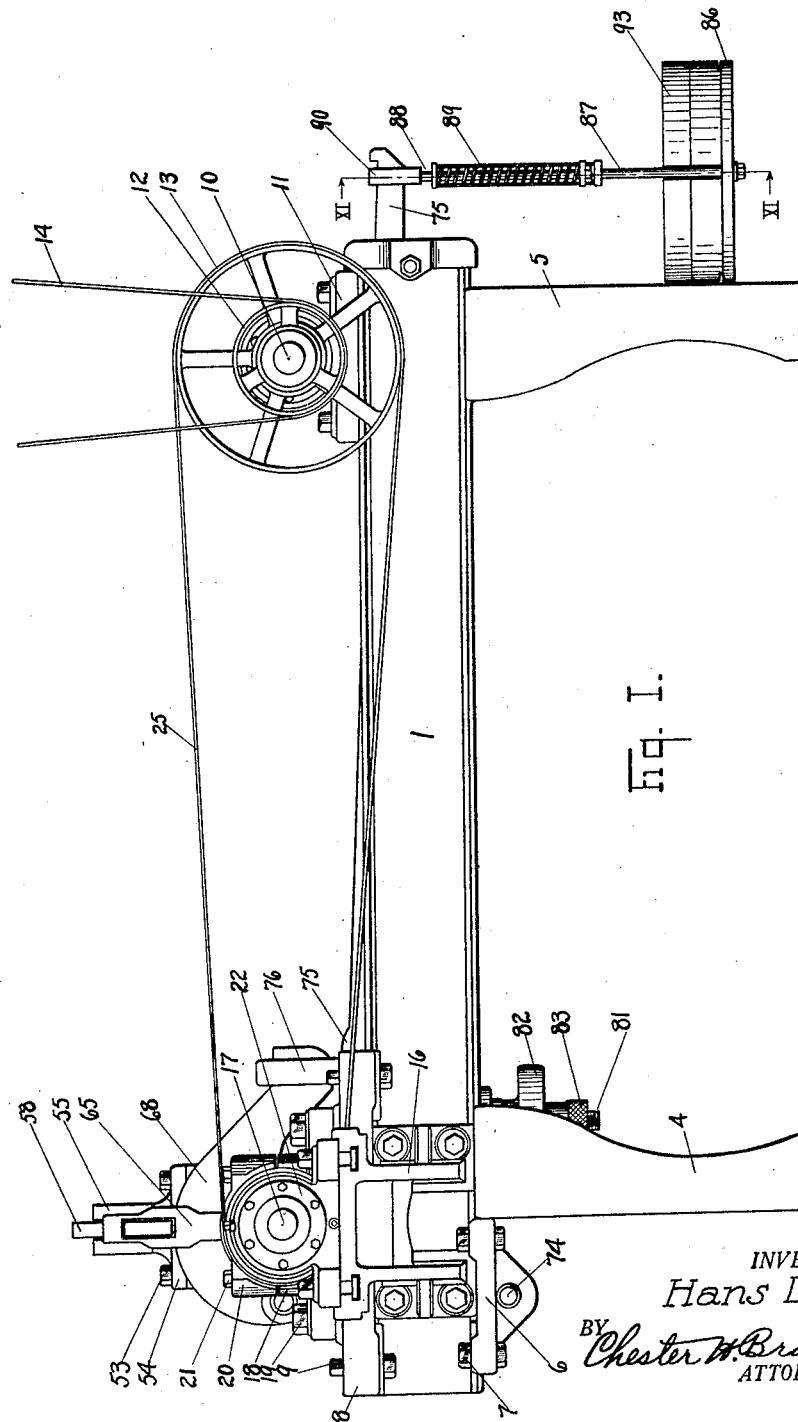

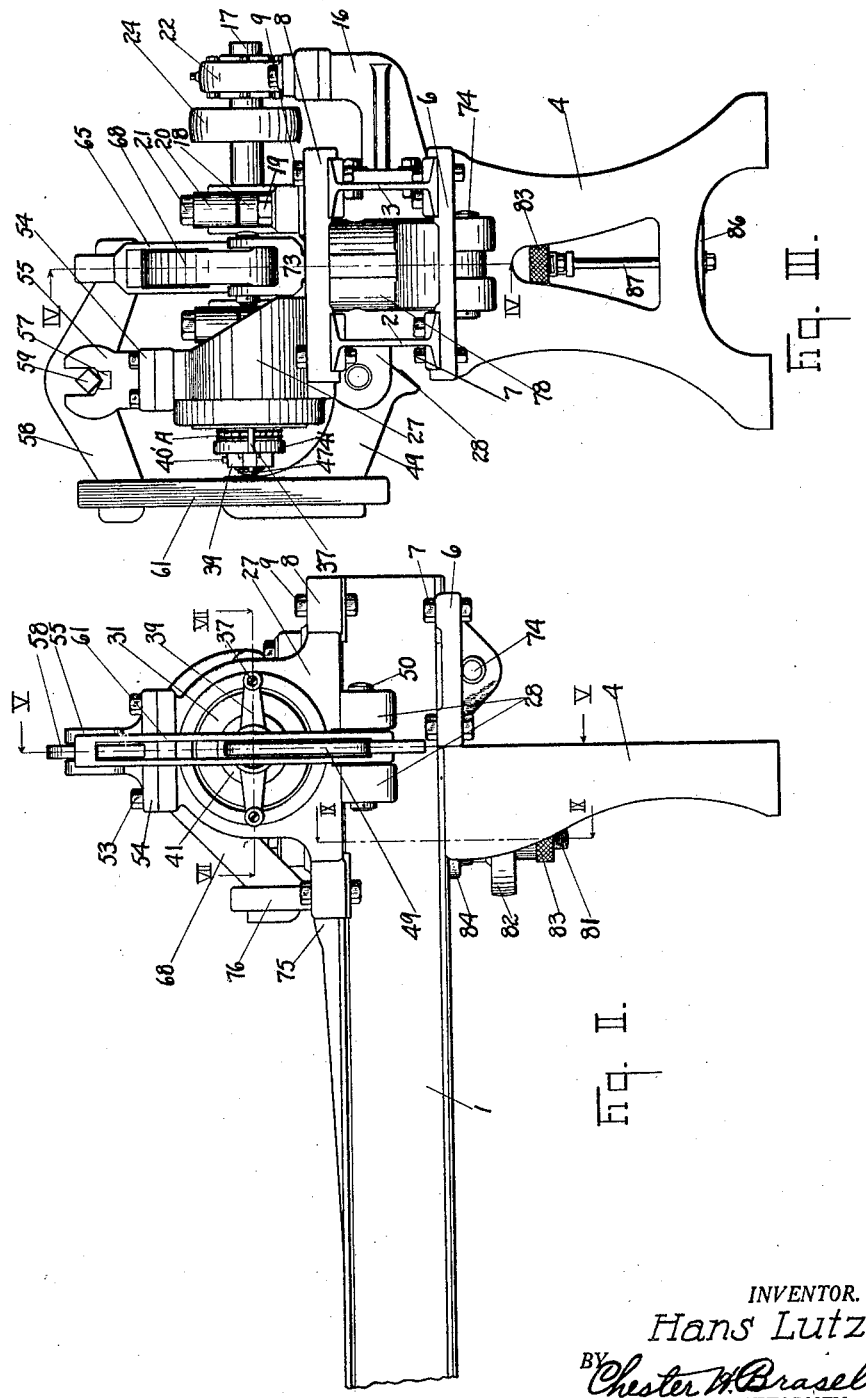

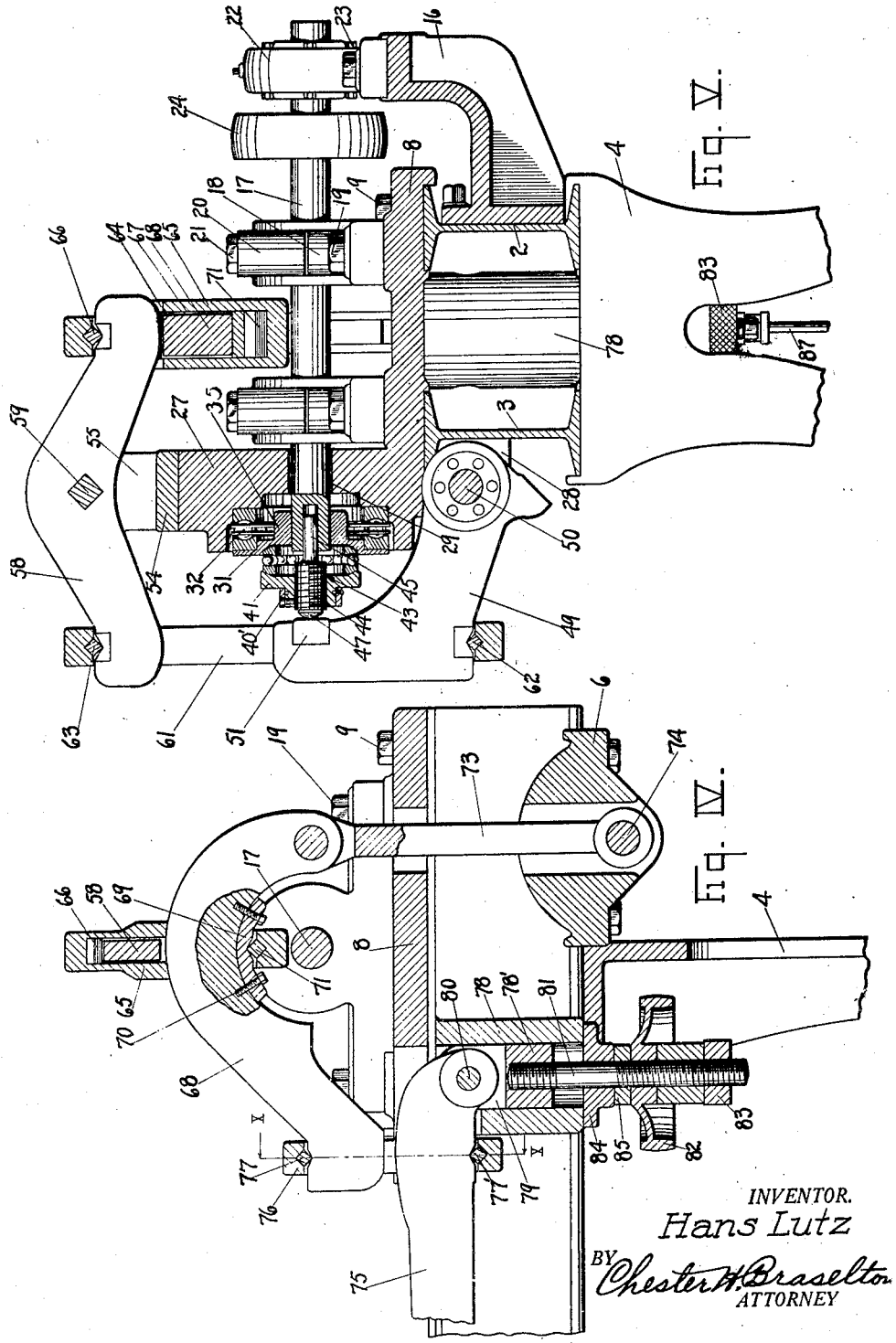

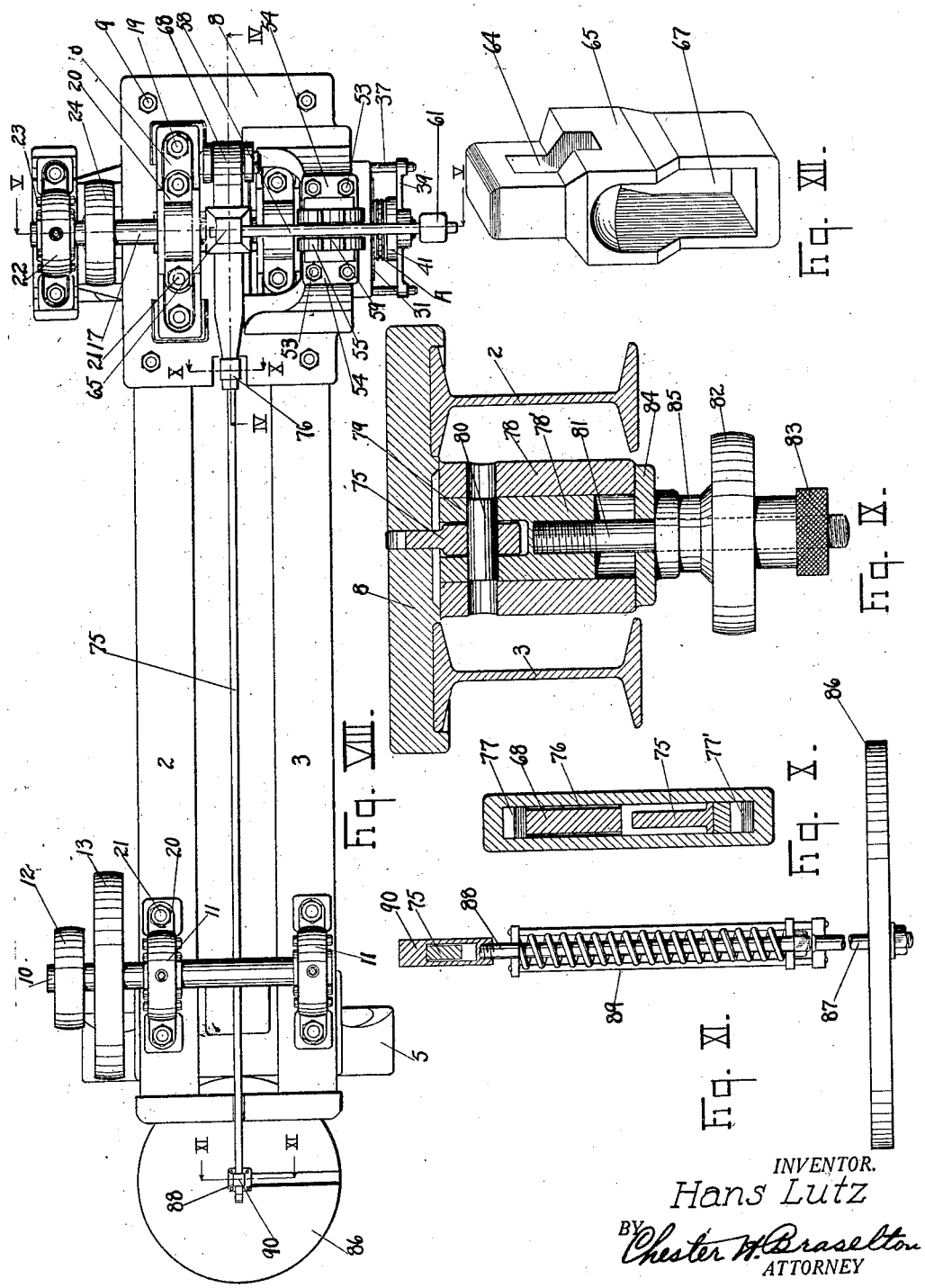

April 22, 1924.                                              1,491,050
                              H. LUTZ
                     MACHINE FOR TESTING BEARINGS
                 Filed June 28, 1919     6 Sheets-Sheet 6
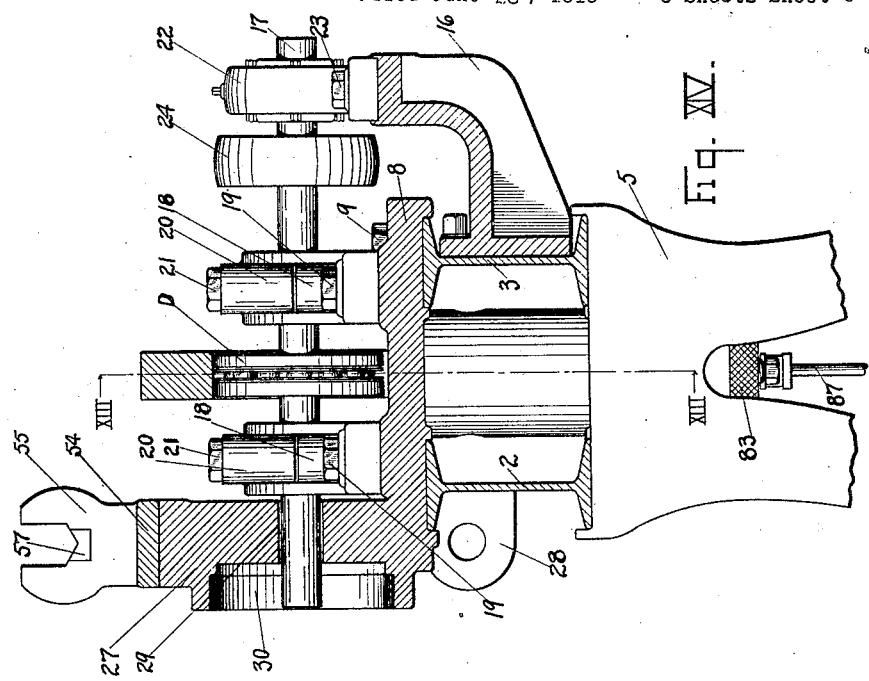
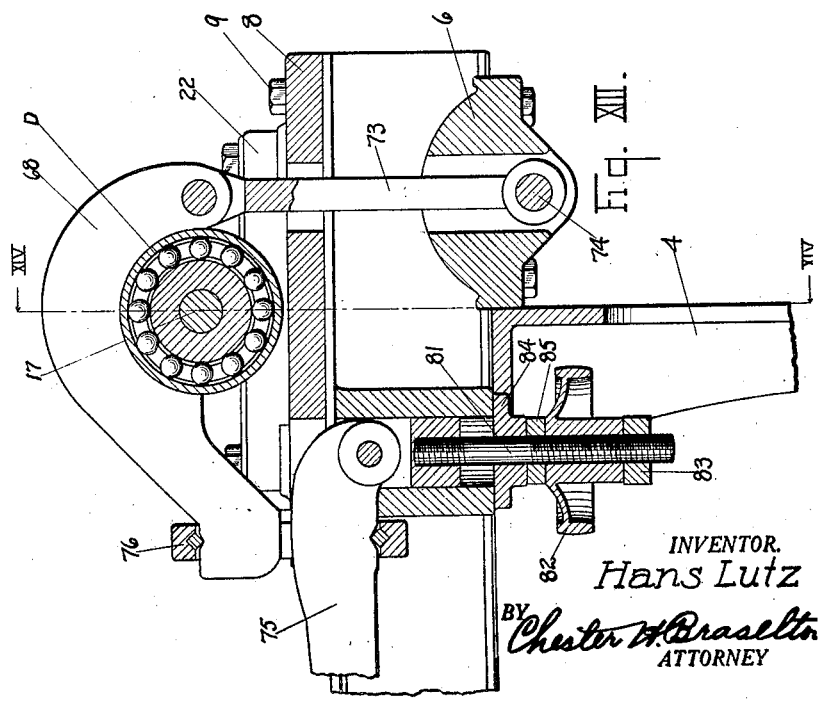
INVENTOR.
Hans Lutz
BY Chester H. Braselton
ATTORNEY Patented Apr. 22, 1924.

1,491,050

UNITED STATES PATENT OFFICE.

HANS LUTZ, OF ELMIRA, NEW YORK, ASSIGNOR TO THE WILLYS-MORROW COMPANY, OF ELMIRA, NEW YORK, A CORPORATION OF OHIO.

MACHINE FOR TESTING BEARINGS.

Application filed June 28, 1919. Serial No. 307,356.

*To all whom it may concern:*

Be it known that I, HANS LUTZ, residing at Elmira, in the county of Chemung, State of New York, have invented certain new and useful Improvements in Machines for Testing Bearings, of which I declare the following to be a full, clear, and exact description.

This invention relates to improvements in machines for testing bearings, and is particularly adapted for use in applying a predetermined test to bearings which are to be tested in such a manner as to approach actual working conditions during the test of the bearing.

One object of the invention is to provide a device of this character wherein a predetermined thrust may be applied to a portion of the bearing being tested.

A further object of the invention is to provide a device of this character wherein either end thrust or lateral thrust may be applied to the bearing while the same is being tested.

A further object of the invention is to provide a device of this character which is of simple construction and efficient in operation.

A further object of this invention is to provide a device of this character having means for rotating the bearing members of an anti-friction bearing relative to each other and simultaneously imparting thereto a predetermined thrust.

Further objects of this invention relate to economies of manufacture and details of construction as will hereinafter appear from the detailed description to follow.

The objects of the invention are accomplished in one instance by the devices and means described in the following specification, but it is evident that the same may be varied widely without departing from the scope of the invention as pointed out in the appended claims.

A structure constituting one embodiment of the invention, which may be the preferred, is illustrated in the accompanying drawings forming a part hereof in which:

Figure I is a side elevational view of the machine.

Figure II is an enlarged elevational view of a portion of the machine when viewed from the side opposite to that shown in Figure I.

Figure III is an end elevational view of the machine shown in Figure I.

Figure IV is a vertical sectional view taken along the line IV—IV of Figures III and VIII and illustrating the pressure exerting mechanism.

Figure V is a vertical sectional view, taken along the line V—V of Figures II and VIII and illustrating the relative position of the rotating shaft with respect to the other mechanism.

Figure VI is a perspective view of the machine illustrating the relative position of the various elements.

Figure VII is a detail horizontal sectional view taken along the line VII—VII of Figure II, for the purpose of illustrating more in detail certain means employed for the purpose of exerting thrust upon the bearings.

Figure VIII is a top plan view of the machine.

Figure IX is a vertical sectional view, taken along the line IX—IX of Figure II and illustrating the manner of pivotally attaching the beam to the frame.

Figure X is a detail sectional view, taken along the line X—X of Figure VIII, and illustrating the manner of pivotally connecting the beam to the pivoted link.

Figure XI is a detail view, partially in section, taken along the line XI—XI of Figures I and VIII, and illustrating the manner of supporting the weight and securing the same to the beam.

Figure XII is a perspective view of the block for connecting the pivoted arm to the balance arm.

Figure XIII is a vertical sectional view taken along the line XIII—XIII of Figure XIV and illustrating the relative position of the parts when arranged for the purpose of exerting a radial thrust upon a bearing.

Figure XIV is a vertical sectional view, taken along the line XIV—XIV of Figure XIII.

In testing roller bearings it is highly desirable to approach as closely as possible the conditions under which the bearings will be used, and in certain cases it is advisable to provide means for applying to the bearings a considerable degree of thrust for the purpose of determining during a comparatively short test whether the bearings are capable of withstanding for a considerable period of time the various strains to which they will ordinarily be subjected.

Bearings specifically constructed for certain definite uses are in some instances required to withstand a considerable degree of end thrust when in use and under certain other conditions of use the bearings are required to withstand only a slight degree of end thrust while being continuously subjected to a considerable degree of radial thrust. In view of these facts it is desirable to provide means for subjecting the bearings to a considerable degree of either radial or end thrust when the same are being tested, and it is also desirable to provide in a single mechanism means for testing the bearings either while being subjected to end thrust or while being subjected to radial thrust. The structure shown in this application is so constructed that it will be capable of being employed to test bearings so as to impress upon the bearings being tested a considerable degree of either end or lateral thrust as may be desired. The provision of a single machine which is capable of testing the bearings when the same are subjected to either end or lateral thrust makes it unnecessary to employ different machines for testing the bearings under the different conditions of thrust, thus serving to eliminate unnecessary machinery.

Referring to the drawings, similar reference characters designate corresponding parts throughout the several views, and the sectional views are taken looking in the direction of the small arrows at the ends of the section lines.

In the embodiment of the invention illustrated herewith, 1 designates broadly the base portion of the machine which comprises a pair of substantially parallel I-beams 2 and 3 resting upon and rigidly supported in any desired manner by front and rear standards 4 and 5 respectively. A plate 6 is firmly secured to the under surface of the I-beams at the forward end of the machine, being attached hereto by bolts 7 or other suitable fastening devices. A table 8 is secured to the upper surface of the I-beams near the front portion of the machine, and is firmly attached to the I-beams by means of bolts 9, the table 8 serving to suitably support the different elements of the operating mechanism in proper position.

A shaft 10 is rotatably supported near the rear end portion of the machine in a pair of bearings 11 removably secured to the upper surface of the I-beams 2 and 3 and properly aligned with respect to each other for the reception of the shaft 10. Secured to one end of the shaft 10 are a pair of pulleys 12 and 13, the pulley 12 being connected by means of a belt 14 with a source of power (not shown).

An angular bracket 16 is bolted or otherwise firmly secured to one of the I-beams 3 near the forward end portion of the machine, the upper surface of the angular bracket being substantially level with the upper surface of the table 8. A shaft 17 is rotatably mounted in aligned bearings near the front end of the machine, two of these bearings being carried by the table 8 while the third is supported upon the upper surface of the angular bracket 16. The bearings supported by the table 8 are each formed in two parts, comprising a base portion 18 adapted to be firmly secured to the upper surface of the table by bolts 19, and an upper portion 20 which is adapted to be firmly secured to the base portion thereof by means of bolts 21. The bearing 22 supported by the angular bracket 16 is so mounted as to be in alignment with the two brackets previously described and is firmly secured to the angular bracket by means of bolts 23. The shaft 17 rotatably mounted in the bearing is provided with a pulley 24 firmly keyed thereto, the pulley 24 being mounted in alignment with the pulley 13 carried by the shaft 10 and is driven therefrom by means of a belt 25. A casting 27 is formed integral with and extends from one side edge of the table 8, the said casting being preferably provided with a pair of downwardly extending lugs 28 which extend beneath the table 8 and have their inner edges positioned in proximity to one side of the I-beam 2. The casting 27 is provided with an opening 29 extending therethrough for the reception of one end portion of the shaft 17 and the casting is further provided upon one face thereof with a circular recess 30 substantially concentric with the opening 29 previously described. A circular plate 31 is firmly secured to the end portion of the shaft 17 and is separated from the casting 27 by an anti-friction bearing 32 positioned between the inner face of the plate 31 and the outer face of the casting 27 and located within the recess 30 formed in one side of the casting. The plate 31 is non-rotatably secured to the end of the shaft 17 by means of a pair of splines 34 positioned within corresponding grooves formed in the outer surface of the shaft 17 and the hub 35 of the plate 31. The plate 31 is provided upon its outer face with a circular recess 36 positioned in such a manner as to be substantially concentric with the axis of the shaft 17.

Threaded within openings formed in the outer face of the casting 27 and positioned diametrically opposite from each other with respect to the shaft 17 are a pair of guide rods 37 which are adapted to be slidably received in openings 38 formed in a non-rotatable spider 39 which co-operates with the plate 31 for the purpose of exerting end thrust upon the bearing to be tested. The spider 39 is provided with an opening 40 substantially centrally thereof, and a non-rotatable member 41 has a portion thereof positioned within the opening 40 formed in the spider 39 and is provided upon the opposite face thereof with a recess 42 similar to and registering with the recess 36 formed in the outer face of the plate 31. That portion of the non-rotatable member for extending within the opening 40 in the spider is firmly secured to the spider by means of set screws 40'. The member 41 is provided with a threaded opening formed substantially centrally thereof within which is adjustably positioned a guide rod 43. The guide rod 43 is provided with a threaded portion 44 positioned within the threaded opening formed in the member 41 and a reduced portion 45 slidably received within a central opening 46 formed in the end of the shaft 17. The outer end of the guiding pin 43 is provided with a rounded head 47 formed for a purpose which will hereinafter be described.

When the shaft 17 is rotated by power being applied to the shaft 10 through the pulley 14, the plate 31 is rotated therewith, but is held against movement in a direction axially of the shaft 17 and is permitted to rotate freely relative to the casing 27 by means of the anti-friction bearing 32 interposed between the inner surface of the plate 31 and the outer surface of the casting 27. The non-rotatable member 41 is firmly secured against rotation relative to the shaft 17 while a certain amount of sliding movement of the member 41 in a direction axially of the shaft 17 is permitted. The supplemental guide shaft 43 serves to assist the guide rods 37 in maintaining the non-rotatable member 41 in a position at substantially right angles to the axis of the shaft 17 at all times. The bearing to be tested, which in the present instance comprises the inner and outer bearing members B and C, together with a plurality of anti-friction elements A interposed therebetween, is so positioned that the outer surfaces of the bearing members are located within the corresponding recesses 36 and 42 formed in the outer face of the plate 31 and the inner face of the member 41 respectively. If it should be desired to test bearings in which the inner and outer bearing members are so constructed as to present an outer configuration differing materially from those illustrated in Figure VII, it will be understood that it is possible to readily substitute another plate 31 and member 41 wherein the recessed openings 36 and 42 are shaped to correspond with and provide an extended bearing surface for the inner and outer bearing members which are to be tested. From the above description it will be clear that when the shaft 17 is rotated the plate 31 is rotated therewith, while the non-rotatable member 41 is held against rotation relative to the shaft 17 thus the inner and outer bearing members of the bearing to be tested are rotated relative to each other as is the case when the bearing is in actual use.

Having thus described the manner of positioning the bearing to be tested relative to the shaft 17, the means for imparting thrust to the bearing will now be described. A pivoted arm 49 has one end portion thereof extending between the downwardly extending lugs 28 previously described and is pivotally secured thereto by means of the pivot pin 50. The arm 49 is of angular construction having a portion extending upwardly into proximity with the rounded end 47 of the guide pin 43 at which point it is provided with a hardened steel inset 51 so positioned as to contact with the rounded end portion of the guide pin 43 for the purpose of exerting presure thereon. Firmly secured to the upper surface of the casting 27 as by means of bolts 53 is a block 54 provided with a pair of spaced standards 55 extending upwardly therefrom, each of said standards being provided at its upper end with a recess 56 having a hardened steel bearing 57 inset therein. A balance arm 58 has the central portion thereof positioned between the upwardly extending standards 55 and this bearing arm is provided with oppositely extending bearing lugs 59 which are adapted to fit within the opening 56 formed in the upper end portions of the standards and rest upon the hardened steel insets 57 in such a manner as to provide one point bearings for the balance arm. A link 61 connects one end of the balance arm 58 with the pivoted lever arm 49 previously described, one point bearings 62 and 63 similar to the bearings previously described being employed for the purpose of so connecting the link to the balance arm and the pivoted lever as to eliminate as far as possible frictional resistance to their free movement within their limits of movement. The oppositely extending end of the balance arm 58 projects within an opening 64 formed in a block 65 and a one point bearing 66 is provided between the end of the balance arm and the engaging portion of block. The block 65 is provided with an opening 67 extending therethrough at substantially right angles to the opening 64 previously described, and a pivoted lever 68 is positioned within the opening 67, the lever 68 being provided upon the under surface thereof with a hardened steel plate 69 secured to the under surface of the lever by means of screws 70 and adapted to bear against a bearing 71 positioned within the opening 67 to permit free movement of the pivoted lever relative to the block 65. Pivotally connected to one end of the lever 68 is a link 73 which is in turn pivotally connected to the plate 6 as at 74. The opposite end portion of the pivoted lever 68 extends rearwardly of the machine and is connected to a beam 75 by means of a link 76, the link 76 being provided with one point bearings 77 and 77' for engagement with the pivoted lever 68 and the beam 75 respectively, these bearings being similar in all respects to those previously described. The beam 75 is pivotally connected to a fixed portion of the frame in a manner which will now be described.

Extending downwardly from the table 8 and formed integral therewith or secured thereto in any suitable manner is a casing 78 within which is adapted to slide freely a plunger 78'. The plunger 78' is provided at one end with a pair of spaced extensions 79 between which the end of the beam 75 extends and to which the same is pivotally secured by means of a pivot 80. The opposite end portion of the plunger is provided with a threaded opening within which is firmly secured a downwardly extending rod 81. The lower end portion of the rod 81 is threaded for the purpose of receiving an adjusting wheel 82 and a lock nut 83. Bearing against the under surface of the casing 78 is a spacing plate 84 provided with a central opening therein for the reception of the rod 81. A spacing washer 85 may, if desired, be interposed between the upper surface of the adjusting wheel 82 and the lower surface of the spacing plate 84. It will be understood that from this manner of mounting the end of the beam 75 a ready means is provided for adjusting the end of the beam vertically in such a manner as to permit the same to occupy at all times a substantially horizontal position regardless of what position may be occupied by the end of the pivoted lever 68. The beam extends rearwardly of the machine and a weight pan 86 is secured to the rear end portion thereof by means of rods 87 and 88 connected by a resilient connection 89, the rod 88 being secured to a sleeve 90 which is adapted to receive the end portion of the beam.

From the description it will be seen that the shaft 17 is capable of being rotated from the shaft 10 by the belt 25, and when the bearing to be tested is positioned between the plate 31 and the non-rotatable member 41 the opposite bearing members will be rotated relative to each other, while pressure exerted against the rounded head 47 of the guide pin 43 will subject the bearing to a certain degree of end thrust, the amount of which may be readily determined by computation from the lengths of the several levers employed, when considered in connection with the amount of weight applied to the weight pan 86. The bearing portion 51 of the lever 49 is pressed into contact with the rounded end portion of the guiding pin 43 through the influence of the link 61 and the balance lever 58 while the opposite end of the balance lever 58 will be drawn downwardly by the pivoted lever 68 by the weight exerted by the beam 75 and the weight carried thereby. The provision of one point bearings between the ends of the several levers and the connections co-operating therewith serves to reduce to the lowest possible point the frictional resistance to the free movement of these parts, and as the same are normally movable only within narrow limits, the frictional resistance is by this means practically eliminated so that the amount of thrust exerted upon the elements of the bearing can be more exactly determined. A plurality of different weights 93 are adapted to be placed upon the weight pan 86 for the purpose of increasing the pressure exerted against the bearings to any desired extent. It will be obvious that the amount of thrust exerted upon the bearings by any given weight applied to the weight pan can be readily determined by measuring the effective lengths of the levers and calculating the force exerted in accordance with the well known principles applicable to levers.

In Figures XIII and XIV is shown the manner of testing bearings when it is desired to test the same under a radial pressure. When the machine is employed in this connection the pivoted arm 49, link 61, balance lever 58 and connecting block 65 are dispensed with as well as the steel plate 69 and screws 70, and the bearing to be tested which in the present instance is indicated by D is driven upon the shaft 17 after the shaft has first been removed from its aligned bearings and positioned thereon in such a manner as to be located directly beneath the pivoted lever 68. The pivoted lever 68 is so formed that the under surface thereof fits upon the outer sleeve of the bearing or the outer bearing member throughout substantially 180° of its circumference. The lever 68 is pivoted to the link 73 which is in turn pivoted to the plate 6 as at 74 in the manner previously described, while the opposite end of the pivoted lever 68 is connected to the beam 75 by means of the link 76. Any suitable or desired number of weights may be applied to the weight pan carried by the beam 75 so as to impress any desired amount of radial thrust upon the bearing which is to be tested. During the test the shaft 17 is rotated in the manner previously described in connection with testing bearings under a predetermined end thrust, thus the bearings are subjected to the desired amount of radial thrust while rotated under conditions similar to those encountered in actual use. It will be understood that the amount of radial pressure exerted upon the bearings can be readily determined from the weights applied to the weight pan taken in connection with the length of the levers and the distances between their fulcrums and the points of application of the weight and power. From the above description it will be understood that this machine is capable of being employed for the purpose of applying a predetermined end or radial thrust to bearings being tested under conditions approximating those of actual use. By increasing or decreasing the weight carried by the weight pan, the radial or end thrust impressed upon the bearing may be varied as desired within such limits as may be desirable in order to subject the bearing to a complete test.

While I have shown and described in considerable detail a specific embodiment of my invention, it is to be understood that this showing and description is illustrative only and for the purpose of rendering my invention more clear, and that I do not regard the invention as limited to the details of construction illustrated or described, nor any of them, except in so far as I have included such limitations within the terms of the following claims in which it is my intention to claim all novelty inherent in my invention broadly as well as specifically.

What I claim as new and desire to secure by Letters Patent is:

1. In a device of the class described, a frame, a rotatable shaft, a member non-rotatably mounted adjacent said shaft, a lever pivoted at one end to the frame and engaging the non-rotatable member, a beam, links connected between the lever and beam, a means for exerting a predetermined pull upon the beam whereby a predetermined thrust will be exerted upon an anti-friction bearing interposed between the rotatable shaft and the non-rotatable member.

2. In a machine of the class described, a rotating shaft, means for supporting an anti-friction bearing in either of two positions relative to the shaft so as to cause rotation of one of the bearing members relative to the other, and means for imparting an end thrust or a radial thrust to the anti-friction bearing during the rotation of the shaft dependent upon which of the two positions is occupied by the bearing.

3. In a machine of the class described, a rotating shaft, means for supporting an anti-friction bearing in either of two positions relative to the shaft so as to cause rotation of one of the bearing members relative to the other, and means for imparting an end thrust or a radial thrust of a predetermined amount to the anti-friction bearing during the rotation of the shaft dependent upon which of the two positions is occupied by the bearing.

4. In a bearing testing machine, a rotatable shaft adapted to support a bearing to be tested at a point adjacent one end of said shaft or intermediate its ends, a lever and means operable therefrom to exert end thrust upon a bearing thus carried by said shaft adjacent the end of said shaft or to exert radial thrust upon such bearing when carried by the shaft intermediate the ends of said shaft.

5. In a testing machine, means for operatively supporting a bearing in either of two operative positions, a beam, and means operatively connected with said beam for transmitting to the bearing thus supported either end or radial thrust depending upon the position of the bearing upon the supporting means.

6. In a testing machine, means for operatively supporting a bearing in either of two operative positions, a beam and means operatively connected with said beam for subjecting the bearing thus supported to a predetermined end or radial thrust depending upon the position of the bearing upon the supporting means.

7. In a testing machine, a rotatable shaft for operatively supporting a bearing in either of two operative positions, a beam and means operatively connected with said beam for subjecting the bearing thus supported to either end or radial thrust depending upon the position of the bearing upon the shaft.

8. In a testing machine, means for operatively supporting a bearing in different operative positions, a beam and selectively operative means connected with said means for subjecting the bearing thus supported to a predetermined end or radial thrust depending upon the position of the bearing upon the supporting means.

9. In a testing machine, a frame having a rotatable shaft, adapted to support a bearing to be tested, a beam pivotally mounted upon said frame, and selectively operable systems of levers adapted for connection with said beam for applying either end or lateral thrust to said bearing.

10. In a testing machine, a rotatable shaft mounted upon said machine, means for rotating said shaft, and means carried by said machine and including a single weighted beam for applying a predetermined end or radial thrust to bearings operatively mounted upon said shaft.

11. In a testing machine, a rotatable shaft, means for rotating said shaft, a lever and means whereby said lever may exert either end or radial pressure upon a member carried by said shaft during rotation of the shaft.

12. In a testing machine, a rotatable shaft, means for rotating said shaft, and selectively operable means controlled by a single member for exerting either end or radial pressure upon a member carried by said shaft during rotation of the shaft.

13. In a bearing testing machine, a frame, a beam pivoted thereto, a lever operatively connected with said beam, a shaft rotatably mounted in said machine and adapted to carry a bearing to be tested, said lever being positioned to exert a radial thrust upon said bearing, and means comprising a second lever operatively connectable to said first lever for exerting an end thrust upon a bearing to be tested.

14. In a bearing testing machine, a frame, a shaft journaled therein for carrying a bearing to be tested, a beam, and means operatively connected to said beam for subjecting said bearing either to end thrust or to radial pressure.

15. A bearing testing machine, a frame, a shaft journalled therein, and adapted to support a bearing either at one end or intermediate its ends, an actuating beam, a lever operatively connected with said beam for subjecting a bearing intermediate the ends of said shaft to radial pressure, and a second lever adapted to be operatively connected with said first lever for subjecting a bearing on the end of said shaft to end thrust.

In testimony whereof, I affix my signature.

HANS LUTZ.